United States Patent [19]
Walters

[11] 3,854,603
[45] Dec. 17, 1974

[54] SECURITY SYSTEM AND METHOD FOR VALUABLES

[75] Inventor: Russell W. Walters, Reading, Pa.

[73] Assignee: BMR Security Products Corp., Reading, Pa.

[22] Filed: Jan. 22, 1973

[21] Appl. No.: 325,333

[52] U.S. Cl................. 214/16 B, 104/91, 186/2, 214/152
[51] Int. Cl............................................... B65g 1/08
[58] Field of Search............... 214/38 R, 16 B, 152; 104/89, 91, 113; 243/1; 186/1 R, 2, 3

[56] References Cited
UNITED STATES PATENTS

| | | | |
|---|---|---|---|
| 1,603,570 | 10/1926 | Wing.................................... | 214/38 |
| 1,883,493 | 10/1932 | Berg............................... | 214/38 R X |
| 2,124,444 | 7/1938 | Boumans et al................... | 214/16 B |
| 3,448,870 | 6/1969 | Gallo et al......................... | 214/16 B |
| 3,507,409 | 4/1970 | Gordon et al..................... | 214/38 R |

*Primary Examiner*—Robert G. Sheridan
*Attorney, Agent, or Firm*—Maleson, Kimmelman & Ratner

[57] ABSTRACT

A method and system for collecting boxes containing valuables and safeguarding the boxes in a secure area. A series of empty carriers are moved on a track to a loading station within a depot. Each carrier is moved one at a time to the loading station which is adjacent to an access door opening to the outside of the secured area. An operator outside of the depot unloads an empty box mounted on the carrier which is positioned in the loading station. The operator mounts a loaded box taken from a vehicle, onto the carrier and the carrier by gravity assist moves through a secure tunnel to a predetermined point within the secured area. An operator internal to the enclosure may release the loaded carrier and insert the valuables contained in the boxes into compartments. The empty carriers are then mounted on a track and are moved to the loading station to permit boxes containing valuables to be loaded onto the carriers.

11 Claims, 13 Drawing Figures

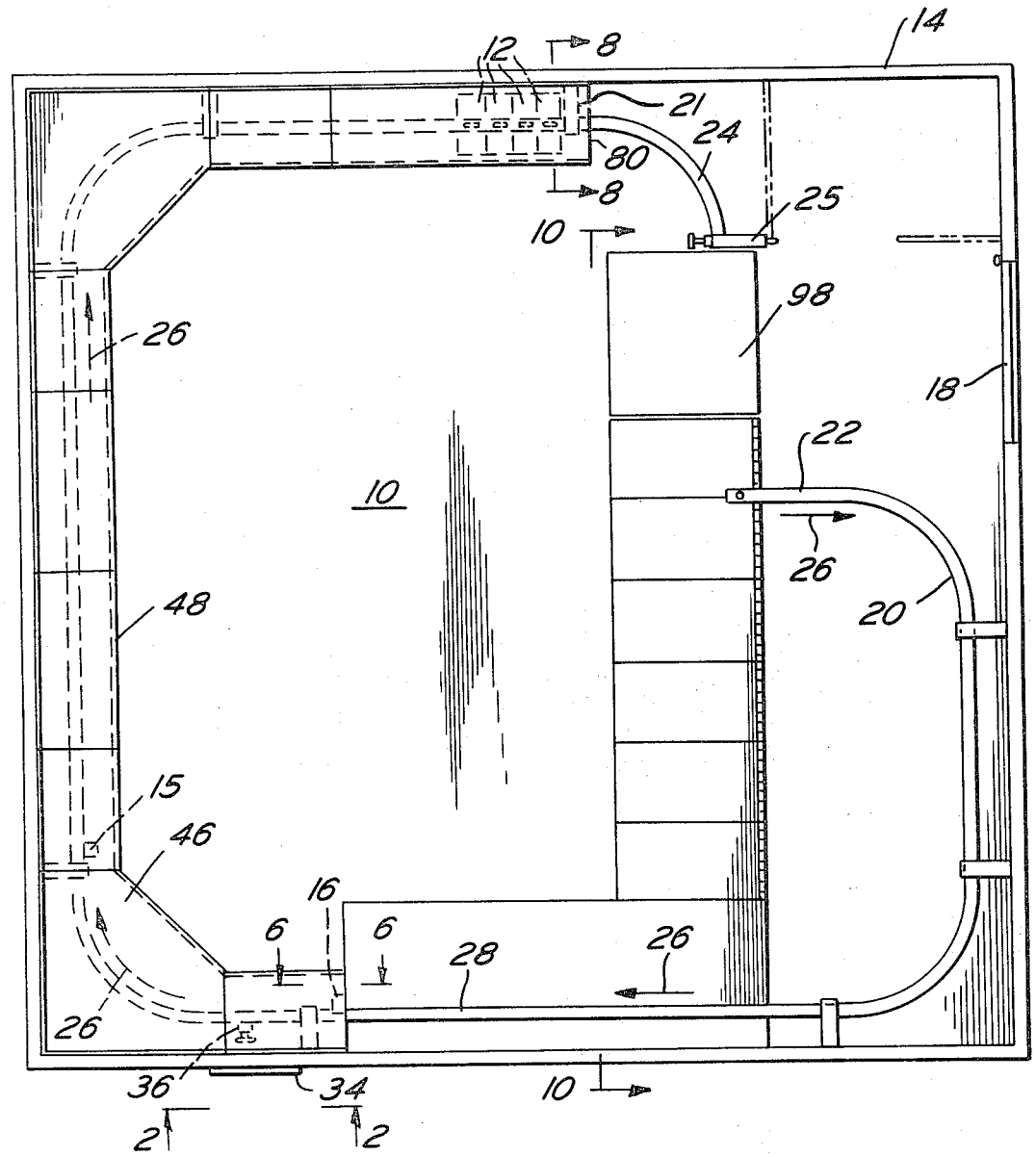
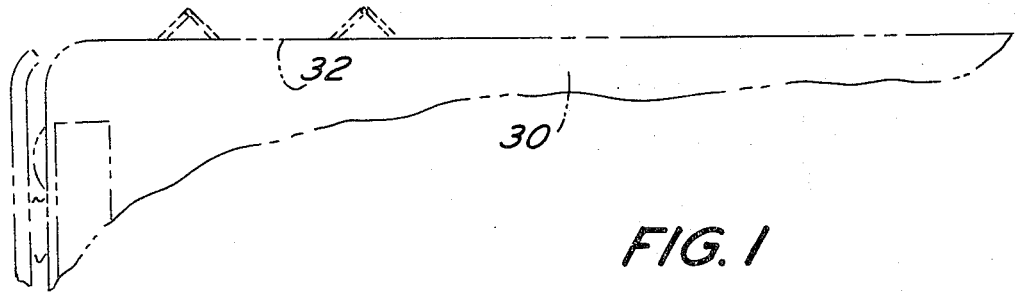
FIG. 1

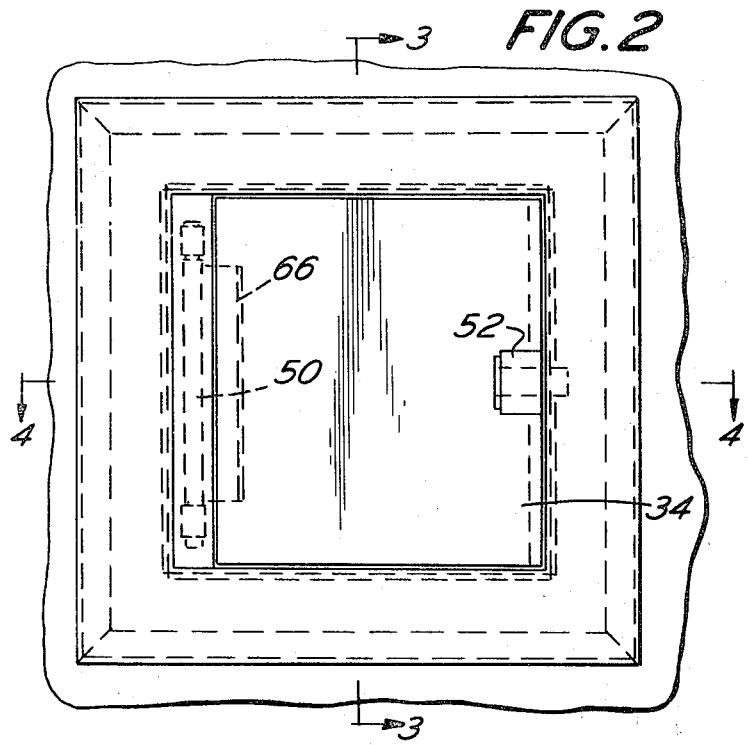
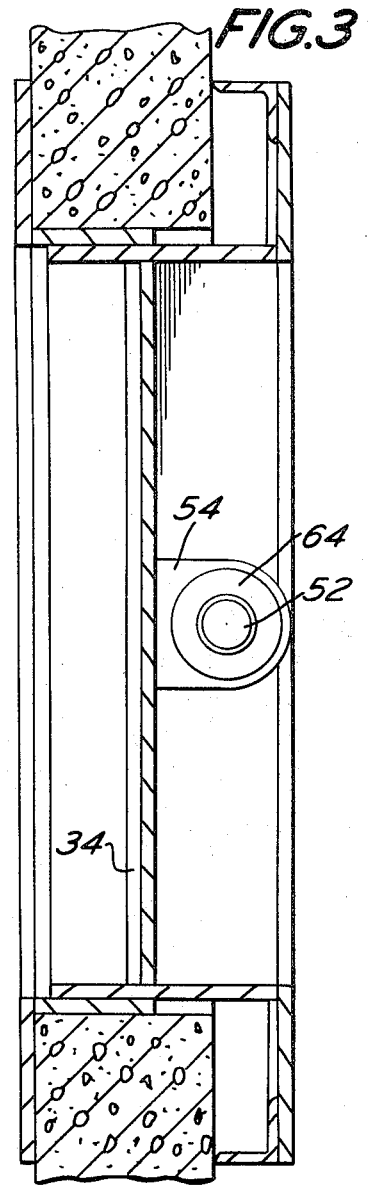
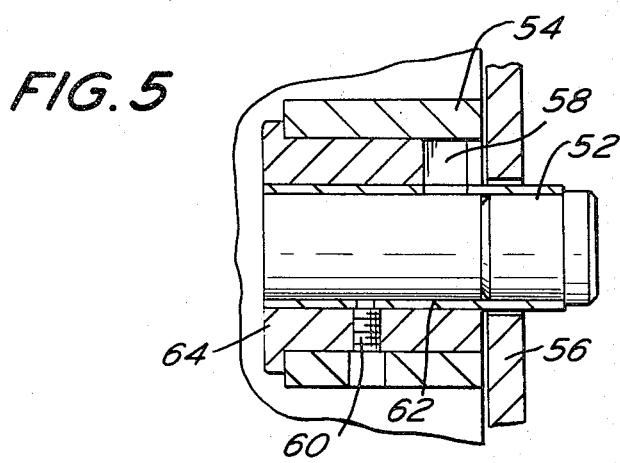
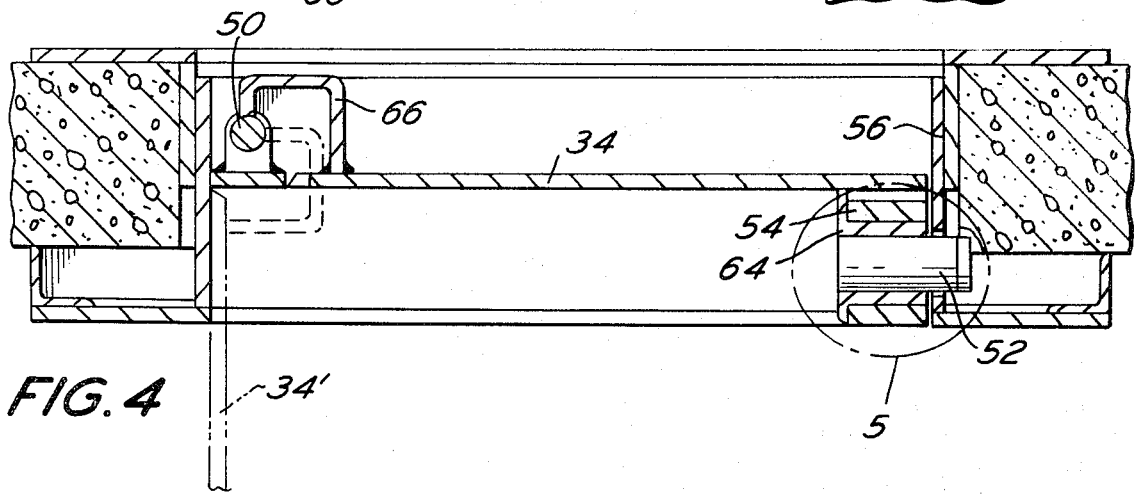

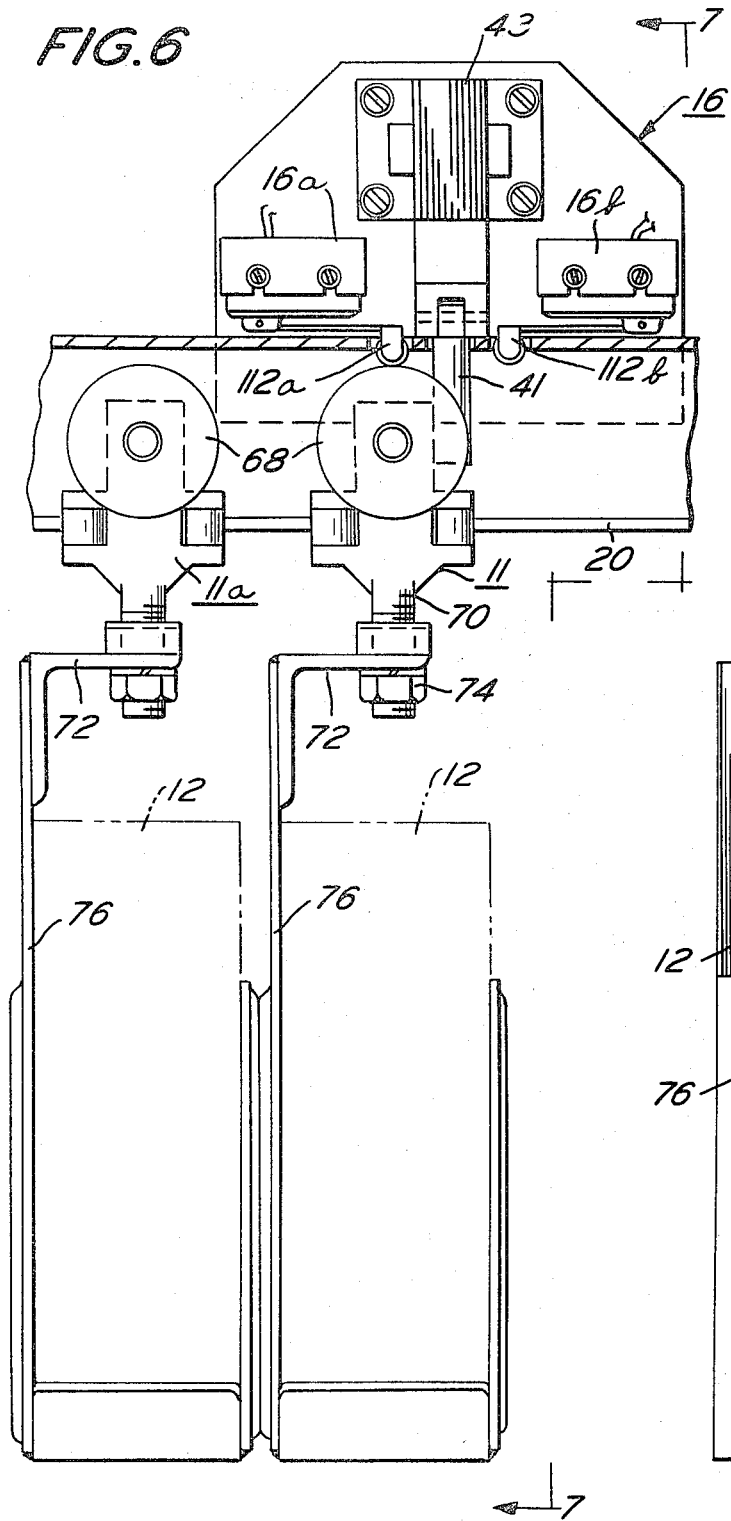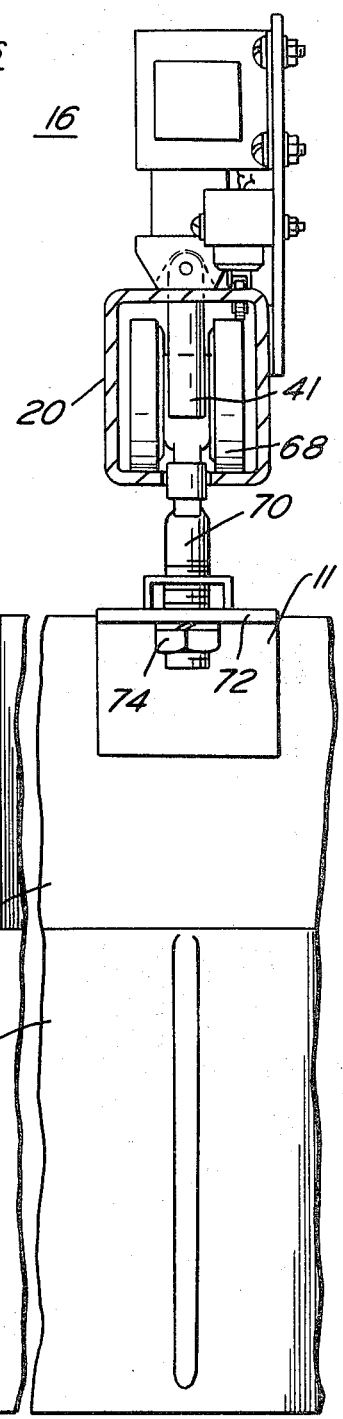

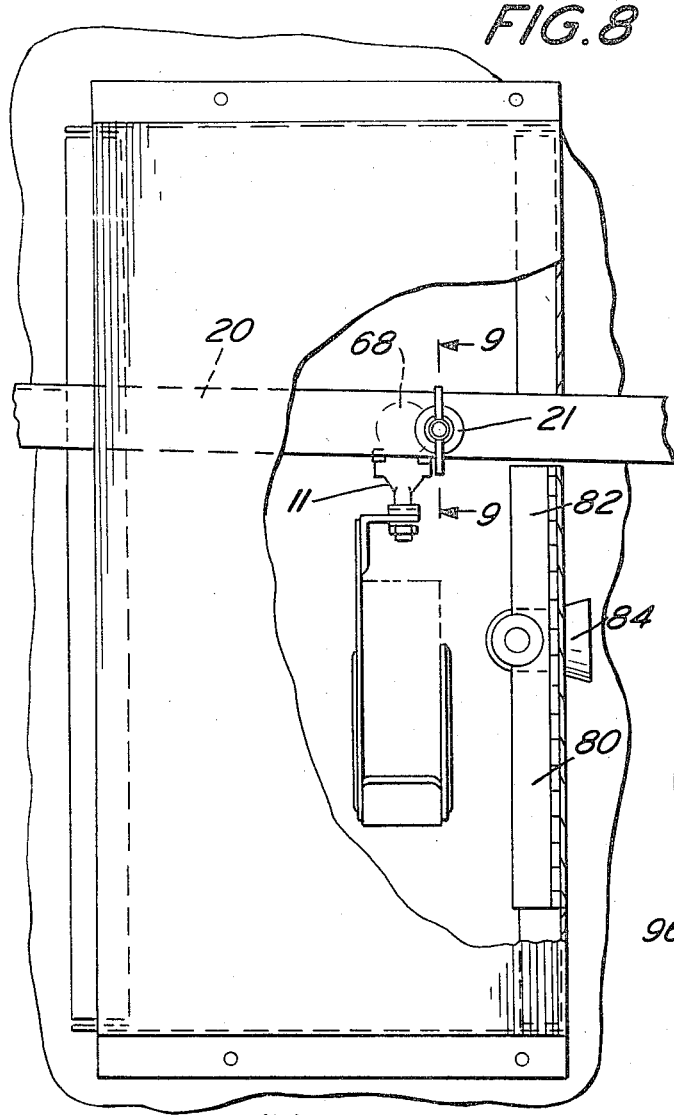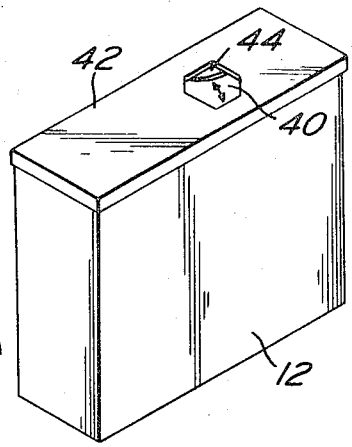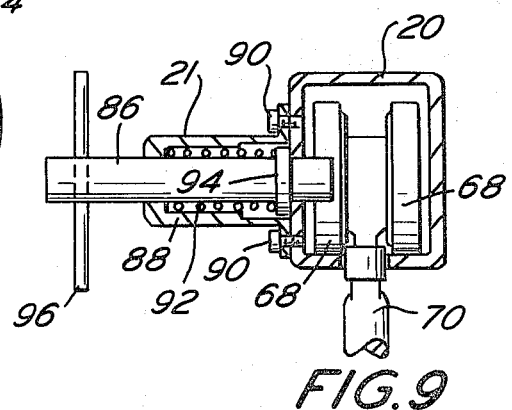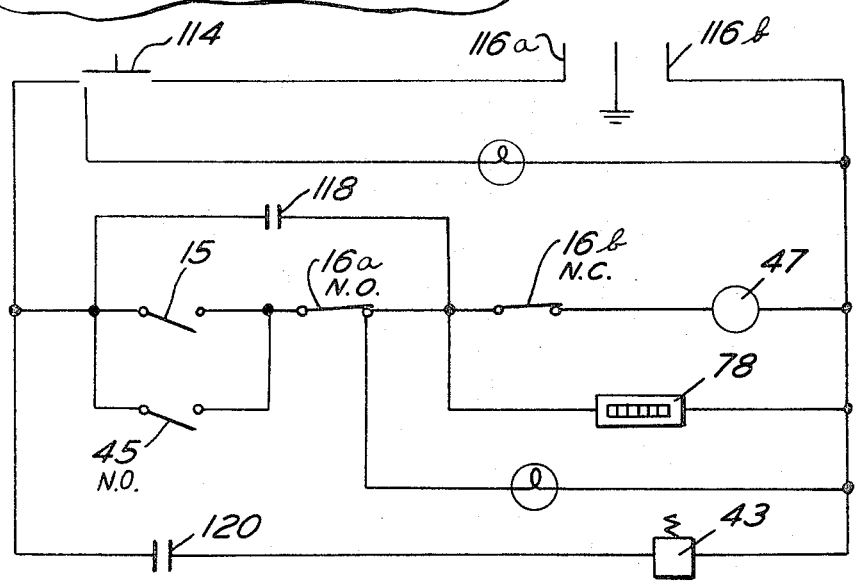

SECURITY SYSTEM AND METHOD FOR VALUABLES

BACKGROUND OF THE INVENTION

A. Field of the Invention

This invention relates to the field of security systems and methods for conveying valuables.

B. Prior Art

Security has always been a problem when valuables such as money is collected from many cash boxes. Cash boxes may be of the type carried by delivery trucks or buses. The danger of armed robbery becomes particularly acute if the time of collection occurs in the nighttime. In a conventional procedure for buses, at an end of their routes or at a depot the money from the cash boxes is collected at a central location. However, since a large amount of money is being collected at these central locations they have become choice targets for armed robbery. In addition those persons responsible for the cashier function work a normal working day though the actual money collection may take place any time during the day or night. Thus, employee accountability of the money collected as well as actual theft have been important problems.

SUMMARY OF THE INVENTION

The method of collecting boxes containing valuables and safeguarding the boxes in a secure area which includes the step of moving a carrier with an empty box to a loading position accessible to the outside of the secure area. The empty box is removed from the carrier and replaced with a box containing valuables. The carrier is moved into the secure area away from and inaccessible to the loading position.

BRIEF DESCRIPTION OF THE DRAWINGS

FIG. 1 is a top view of the safeguarding system shown within an enclosure;

FIG. 2 is an elevational view of the access door taken along section lines 2—2 of FIG. 1;

FIG. 3 is a side view of the access door taken along section lines 3—3 of FIG. 2;

FIG. 4 is a sectional top view of the access door taken along section lines 4—4 of FIG. 2;

FIG. 5 is a sectional blow-up view of the access door bar lock as is shown in FIG. 4;

FIG. 6 is an elevational sectional view of the escapement mechanism and associated carriers taken along section lines 6—6 of FIG. 1;

FIG. 7 is an elevational sectional view of the escapement mechanism and associated carriers taken along section lines 7—7 of FIG. 6;

FIG. 8 is an elevational view of the end housing assembly partially in section taken along the section lines 8—8 of FIG. 1;

FIG. 9 is a sectional view of the stopping device of end housing assembly taken along the section lines 9—9 of FIG. 8;

FIG. 12 is an isometric drawing of the cash box; and,

FIG. 13 is an electrical schematic drawing of the control circuit for the safeguarding system.

DESCRIPTION OF THE PREFERRED EMBODIMENT

Figure 10:
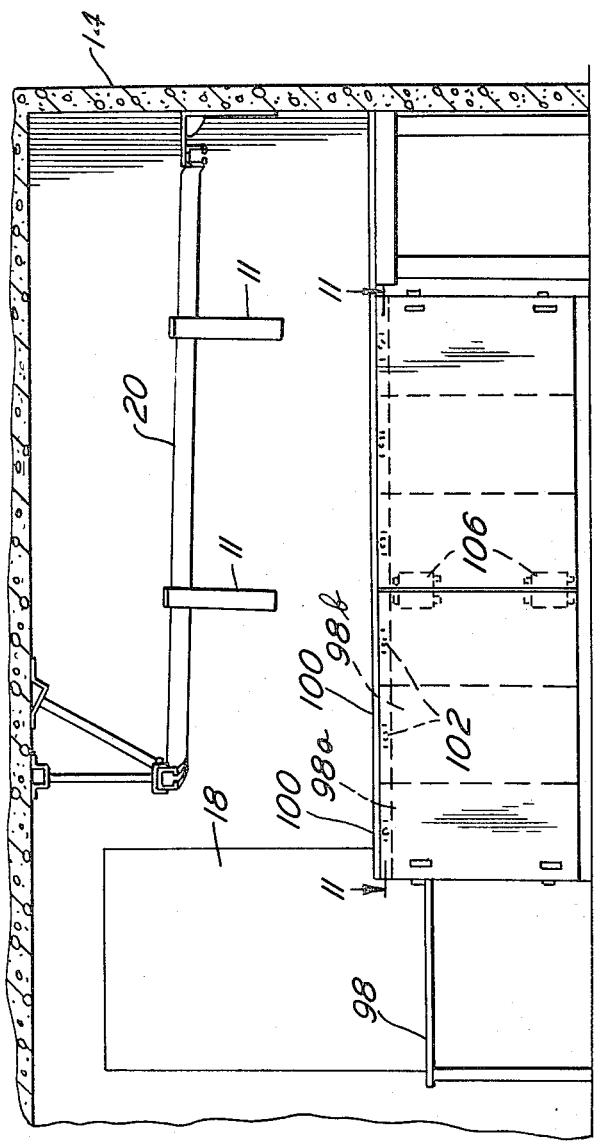
FIG. 10 is an elevational view of a portion of the secure area taken along the section lines 10—10 of FIG. 1.

Referring now to FIG. 1, there is shown collecting and safeguarding system 10 for providing a secure area where cash boxes or other containers 12, shown in FIG. 12, may be maintained in a secure environment for a predetermined period of time. System 10 is maintained within and made part of closed room or other enclosure 14. Room 14 has door or other entrance/exit means 18 to allow workers to enter and exit the secure area defined by the interior of enclosure 14. In general, operation revolves around the concept of the movement of carriers 11, shown in FIGS. 6 and 7, from outside room 14 defining a depot station to a secure area within enclosure 14. Once inside secure depot 14, cash boxes 12, mounted on carriers 11 move within track 20 from loading station 38 to a final station 24. Movement of each carrier 11 is in a direction shown by arrows 26 of FIG. 1. Track 20 is inclined to a horizontal plane throughout its length from initial to final stations 22, 24. Therefore, carriers 11 move throughout the length of track 20 by gravity assist, thus defining a moveable mechanism adapted for carrying an individual box 12.

In general, when a first bus or vehicle 30 arrives at depot 14 a plurality of carriers 11 are queued up one behind the other in the general area of station 28 on track 20 within enclosure 14. The first carrier 11 is held by solenoid controlled stop gate 41 of escapement mechanism 16. Each carrier 11 in the vicinity of station 28 carries an open or empty cash box 12 having been loaded by a cashier or other operator on track 20 at initial station 22 and passed to the general area of station 28 by gravity assist.

As a particular mode of operation, bus or other vehicle 30 arrives at a depot or central location and is driven up to room 14 in a manner such that vehicle door 32 is aligned with access door 34 of system 10 as is shown in FIG. 1. A carrier 11 having an empty cash box 12 mounted thereon is waiting in the loading position at trolley stop 36. A vault man or other operator is stationed at access door 34 and reaches in and removes cash box 12 from carrier 11 at loading station 38 on track 20. With empty cash box 12, the operator then enters vehicle 30, unlocks the door of a full cash box 12 and replaces it with the empty cash box 12 taken from a loading station 38.

Cash box 12 as is shown in FIG. 12 is substantially an enclosure wherein money or other valuables may be inserted through opening 40 formed through surface 42. Cash box 12 includes latch 44 which automatically closes over opening 40 when cash box 12 is removed from its mounting in vehicle 30. Therefore, the full cash box 12 has automatically locked itself upon being removed from its position within vehicle 30. Cash box 12 mounted within vehicle 30 is positionally locked into a fare box within vehicle 30. The operator may take a reading of the totalizer of the fare box within vehicle 30 and write the appropriate data down in a log book. The vehicle number, the trip and the name of the vehicle driver may be entered into the log book as well as the total of the moneys or other valuables contained within cash box 12. The full cash box 12 is coded to the bus and the vault man may then lock the fare box door and vehicle 30 is then ready for a next trip.

The operator leaves vehicle 30 with full cash box 12 and places it within empty carrier 11 which is then at loading station 38. He may then pull a manual release of trolley stop 36 in order that carrier 11 containing full cash box 12 is released from stop 36 and rolls down track 20 in direction 26 into secure tunnel 46. In a manner to be more clearly defined in the following paragraphs, when released carrier 11 passes normally open activating switch 15, stop gate 41 of escapement mechanism 16 is activated. With mechanism 16 actuated stop gate 41 is moved out of an intercepting path with respect to carrier travel within track 20 and another carrier 11 with an empty cash box 12 is allowed to roll from stop gate 41 into loading station 38 at trolley stop 36. After loading by the externally located operator, carrier 11, with the full cash box 12 rolls down track 20 through gravity assist until it reaches a stopping device 21, shown in FIGS. 1, 8 and 9.

Carriers 11 with loaded or full cash boxes 12 roll down track 20 within secure tunnel 46 until they are stopped in the neighborhood of a stopping device 21 by preceding stopped carriers 11, as is shown in FIG. 1. Tunnel 46, through which carriers 11 and cash boxes 12 are moved is formed by tunnel wall 48 passing around track 20 in a totally enclosed manner from a loading station area 38 to an area in the neighborhood of stopping device 21. Tunnel wall 48 passes around track 20 and has a cross-sectional area sufficient to allow a movement of carriers 11 and mounted cash boxes 12 throughout the tunnel length. Walls 48 may be secured directly to the walls of room 14 throughout the tunnel securement length.

It will now be understood that with cash boxes 12 hanging from carriers 11 in the neighborhood of stopping device 21 within secure tunnel 46, access has been restricted not only to robbers but also to the vault man or operator as well. In the event of an attempted robbery, the robbers must enter through door 18 of room 14 which is in turn connected to an alarm system. After gaining entrance to room 14, the robbers must then force their way into secure tunnel 46. Their entrance into room 14 is signaled not only by the door alarm of room 14 but also by detecting devices in tunnel walls 48 as well as the ceiling and floor of room 14. The robbers would not have sufficient time to break through door 18 and securing tunnel 46 before police have arrived when summoned by the plurality of alarm systems as herein noted.

Thus, with only a single person collecting cash boxes 12 and no security people within room 14, the collected cash boxes 12 in tunnel 46 are secure even if the operator is held up. After all of the cash boxes 12 have been loaded on carriers 11, the vault man completes his shift and locks access door 34. Access door 34 defines a doorway mechanism accessible to the outside of the secure area as shown in FIG. 1 and is detailed in FIGS. 2, 3, 4, and 5. Door 34 is mounted to the wall of room 14 through hinge 50. As is shown in FIG. 4, door 34 may be opened outwardly to a position defined by the phantom lines being designated 34. Bar lock 52, similar in construction to the bar lock shown and described in U.S. Pat. No. 3,711,894 maintains a constrained relation between access door 34 and the wall of room 14 when locked. As is shown in FIG. 5, bar lock 52 is insertable within a passage door element 54 and aligned with an opening in room element 56. When bar lock 52 is inserted therebetween, access door 34 is constrained to the wall of room 14 and cannot be opened. Bar lock 52 includes pin insert 58 to permit locking of element 54 to element 56. Set screw 60 permits movement of locking tube 62 in order that bar lock 52 need not be removed completely from tubular element 64 which is secured to door element 54. Bracket 66 is secured to an inner side of access door 34 through welding or some like means as well as to hinge mechanism 50, as is shown in FIGS. 2 and 4. In this manner doorway mechanism 34 permits removal of empty boxes 12 from carriers or moveable mechanism 11 and replacement on carriers 11 of a box 12 containing valuables.

It will be understood that the vault man or other operator working external to room 14 does not have a key or other opening mechanism to door 18 of room 14. The operator working external to room 14 only has a key to bar lock 52 in order to open access door 34. Only the cashier has a key to room 14 and any other mechanism contained therein. Once all of the full cash boxes 12 have been mounted on track 20 and passed to the neighborhood of stopping device 21, the operator's job is completed and he closes access door 34 and locks bar lock 52. The remainder of the operation of safeguarding system 10 is provided by a cashier who has access to room 14. In particular, the cashier works from inside room 14 to place system 10 in running operation for that day as will be described in following paragraphs.

Referring now to FIGS. 6 and 7, each carrier 11 includes a pair of rollers 68. Rollers 68 are mounted within track 20 which is rectangularly shaped in geometric contour when taken in cross section as is shown in FIG. 7. Rod 70 is mounted central to opposing rollers 68 and is bolted or otherwise secured to angle flange 72 by bolt 74 or some like mechanism. Angle flange 72 is secured to U-shaped frame 76 wherein cash boxes 12 are mounted as is shown in FIG. 6. In this manner, carriers 11 are placed in rolling contact with track 20 throughout the length of track 20 from initial station 22 through final station 24 thus effecting a trolley-like movement.

When the cashier enters the secure area defined by the enclosure of room 14, he initially notes the number on counter 78 which is shown in the electrical schematic FIG. 13 and indicates the number of carriers 11 which have been released by escapement mechanism 16. Once the number is noted, the cashier resets counter 78 and unlocks end-housing assembly 80 shown in FIGS. 1 and 8. End-housing assembly 80 includes housing door 82 which is restrained to tunnel wall 48 through housing lock 84 which may be similarly constructed to that of bar lock 52 as has been described. Stopping device 21 is then released and carriers 11 held in line by stop 21 rolled down track 20 until they reach stop 25. Both stops 21 and 25 are similar in construction and the operating mechanism is clearly shown in FIG. 9.

In construction, both stops 21 and 25 include stop shaft 86 being extensible into the path of rollers 68 within track 20 as is shown. Stop casing 88 is mounted to track 20 through bolts 90 and include casing spring 92 coiled about stop shaft 86. Spring 92 engages stop shaft flange 94 on one end and the inner surface of stop casing 88 on an opposing end. Stop shaft 86 may be removed from the path of rollers 68 of carriers 11 by grasping handle 96 and pulling stop shaft 86 outwardly with respect to track 20. In this manner, the cashier may release carriers 11 from end housing assembly 80 to continue their movement on track 22 until they have reached stop 25. In similar fashion, the cashier may release stop mechanism 25 and remove carrier 11 and cash box 12 to be placed on work table 98 which may be the top of a safe or other cabinet.

The full cash box 12 is then identified by the cashier in the log book as entered by the vault man and opens cover 42 of cash box 12 with a key available only to him. The contents of cash box 12 are then emptied into an automatic counter (not shown) which may count and separate the coins or other valuables into differing denomination bags. The cashier checks that the amount of money counted matches with the reading entered into the log book of the totalizer of the respective fare box. Such provides a method whereby the amount noted in the totalizers are the same as that counted by the cashier and thus providing a check on the figures. The cashier then takes empty cash box 12 and replaces it on carrier 11 which is in turn placed at initial station 22 on track 20. The foregoing operation is successively repeated for each of the remaining carriers in the line at stop 25.

Figure 11:
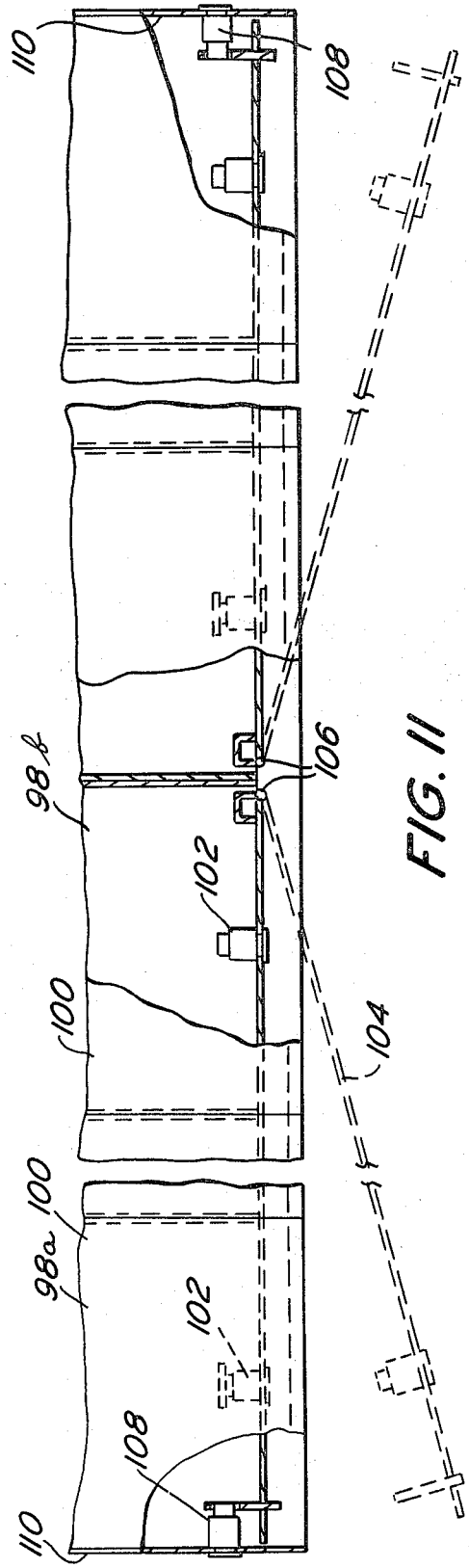
FIG. 11 is a top view of that portion of the secure area shown in FIG. 10 and taken along the section lines 11—11 of FIG. 10.

As a coin bag is filled, the cashier places that bag in a first compartment 98a, shown in FIGS. 10 and 11. All of compartments 98a,b have top doors 100 which are left open to allow the cashier to insert the coin bags. The cashier has no key for these compartments. The top doors 100 of compartments 98a,b are locked through bar locks 102 or some like mechanism which allows the cashier to close top door 100 and lock compartments 98a, 98b when filled. In this way the cashier fills each of compartments 98a, 98b in turn and locks the chamber. The compartments are emptied through side doors 104 by authorized personnel who are supplied with keys to side door bar locks 108 which are mounted to compartment wall 110 and each of compartment side doors 104 as is shown. One side door 104 may pass or enclose a series of compartments 98a,b and are moveable with respect to the compartments through hinge mechanisms 106 as is shown. Thus, to remove the filled compartments 98a,b the side doors 104 are opened by means of keyed bar locks 108 and are swung open from center pivot point 106. The coin bags are removed and side door 104 are then closed and locked.

It will now be understood that the currency security system 10 and method of the present invention provides a secure tunnel 46 for cash boxes 12 within secure room 14 as well as secure compartments 98a, b for coin bags.

As is shown in detail in FIG. 6, two carriers 11, 11a are held by solenoid controlled stop gate 41 of escapement mechanism 16 defining a first mechanism for releasing carriers or moveable mechanism 11 having an empty box 12 into loading station 38. It is assumed that after the cashier has collected all of carriers 11 and has loaded a new batch of carriers 11 onto track 20 at initial station 22, they roll down and are stopped by gate 41 in the neighborhood of line-up station 28. Therefore, as is shown in FIG. 6, the first in line would be carrier 11, the second would be carrier 11a, with the remaining carriers in the line not being shown.

Stop gate 41 is actuated by solenoid valve 43 shown in both FIG. 6 and in electrical schematic diagram FIG. 13. Solenoid 43 is secured to a base frame of mechanism 16 through bolts or some like means. Also secured to mechanism 16 are switches 16a and 16b with the contact 112a of switch 16a engaging roller 68 of carrier 11 actually being held by stop gate 41.

After the cashier has loaded carriers 11, 11a on track 20 he depresses normally open push button switch 45 which is connected in parallel with normally open switch 15 shown in FIGS. 1 and 13. With main switch 114 activated, a circuit may be traced from the source through conductor 116a, switch 45, normally open switch 16a (closed by carrier 11), normally closed switch 16b, and through the winding of control relay 47 to the other conductor 116b and back to the source.

Accordingly, relay 47 is energized and its normally open poles or relay contacts 118 and 120 are actuated to their closed position. Closed contacts 118 provides a short circuit around switches 15, 16a, and 45 while closed contacts 120 are effected to energize solenoid 43 as is shown. Energization of solenoid 43 actuates stop gate 41 to release carrier 11 which rolls down track 20 as a result of the force of the line of carriers 11a, etc. As carrier 11 rolls forward, it actuates the contact of switch 16b until it is stopped by trolley stop 36 as is shown in FIG. 1. When carrier 11 actuates switch 16b, the circuit for relay 47 is open thereby opening relay contacts 118 and 120. With contact 120 open, solenoid 43 is deenergized thereby closing gate 41 and stopping the next carrier in line, 11a. In this manner, when the cashier presses push button 45, he allows a first carrier 11 to roll to loading position or station 38 at trolley stop 36 to permit the vault man or other external operator to retrieve the empty cash boxes 12.

When the vault man manually releases first carrier 11, actuation switch 15 is activated which closes the energizing circuit for relay 47 and the above-described operation repeats to allow successive carriers 11a, etc. to roll down into loading position 38, while gate 41 stops the next carrier 11 in the line. When all of the carriers 11 in the line have been used, switch 16a assumes its normally open position. The system then can no longer operate until the cashier loads a new batch of carriers 11 at initial station 22 on track 20.

Counter 78 is connected between conductors 116a,b and is effected to count the number of times relay 47 is energized which is equal to the number of carriers 11 that are released. The reading of counter 78 is used in the manner as herein described.

What is claimed is:

1. The method of collecting and maintaining containers having valuables stored therein in a fixed secure enclosure comprising the steps of:
 a. moving a carrier to a loading position accessible through a lockable doorway to the outside of said secure enclosure;
 b. mounting a container with valuables stored therein on said carrier;
 c. moving said carrier into and through said secure enclosure;
 d. stopping said carrier in said secure enclosure in a position remote from and inaccessible to said loading position; and
 e. storing said carrier having said container mounted thereon at said remote and inaccessible stopped position within the secure enclosure.

2. The method of claim 1 where the step of moving said carrier to a loading position includes the step of providing said carrier with an empty container mounted thereon.

3. The method of claim 2 where the step of providing said carrier with an empty container is followed by the step of removing said empty container from said carrier after said carrier has moved to said loading position.

4. The method of claim 3 where the step of removing said empty container is followed by the step of opening a fare container mounted external to said secure enclosure and removing a container containing valuables and replacing said container with said empty container.

5. The method of claim 1 including the further step of releasing a next carrier into said loading position as said carrier is moved into said secured enclosure.

6. The method of claim 5 where the step of releasing a next carrier includes the step of actuating a control relay circuit to move a next carrier into said loading position, said control relay circuit being actuated by movement of said carrier into said secure area.

7. The method of claim 1 where the step of moving said carrier into said secure area is followed by the steps of:
 a. removing said container from said carrier;
 b. removing said valuables from said container; and,
 c. storing said valuables in secure compartments within said secure are.

8. A system of collecting and safeguarding in a secure tunnel containers having valuables stored therein, comprising:

a plurality of moveable means each adapted for carrying an individual container;

first means for releasing at least one of said moveable means having an empty container into a loading position;

lockable doorway means accessible to the outside of said secure tunnel to permit removal of said empty container from said moveable means and replacing it with a container having valuables stored therein;

second means for releasing said moveable means from said loading position for movement of said moveable means with said container containing valuables into and through said secure tunnel; and means for stopping said moveable means in said secure tunnel in a position remote from and inaccessible to said doorway means.

9. The system of claim 8 in which there is provided track means for directing said moveable means along a predetermined path into and through said secure tunnel.

10. The system of claim 8 in which said moveable means is displaced along a predetermined path through gravity assist.

11. The system of claim 8 in which there is provided means for controlling said first releasing means to release only one moveable means into said loading position when a previous moveable means has been released from said loading position and moves into said secure tunnel.

* * * * *